Aug. 5, 1958     A. G. KLIWER     2,846,248
TAPERED COUPLING CONNECTION
Filed July 30, 1954

INVENTOR.
Arthur G. Kliwer
BY
*Sam J. Slotsky*
ATTORNEY

United States Patent Office 2,846,248
Patented Aug. 5, 1958

2,846,248

TAPERED COUPLING CONNECTION

Arthur G. Kliwer, Sioux City, Iowa

Application July 30, 1954, Serial No. 446,890

1 Claim. (Cl. 287—2)

My invention relates to a coupling connection.

An object of my invention is to provide a connection in which a pair of joined members such as conveyor members or the like, can be efficiently attached to each other, and so that the connections at the points of attachment will not become loosened during use.

A further object of my invention is to provide an arrangement in which the attachments are quickly and easily made, and in which the attachments can be tightened from time to time if such is desired.

Figure 1:
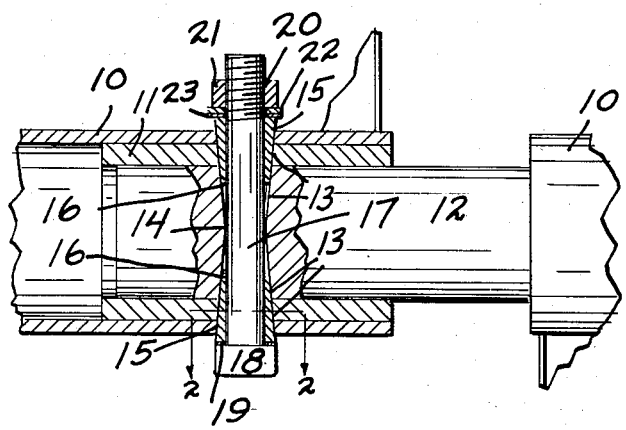
Figures 2, 3:
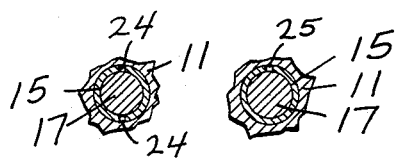
Figure 4:
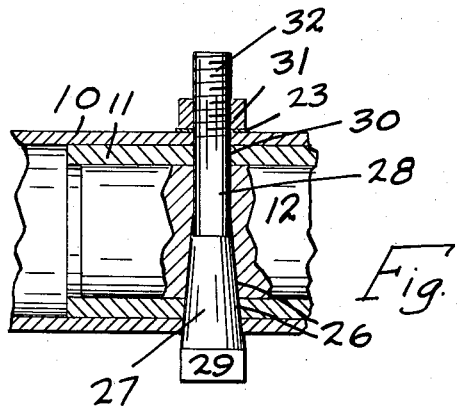

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a generally sectional view taken substantially along the longitudinal axis of a pair of joined conveyor sections using my invention, Figure 2 is a sectional view of Figure 1 taken along the lines 2—2 thereof, Figure 3 is a sectional view similar to Figure 2 showing a slight modification, and Figure 4 is a modified form.

My invention contemplates the provision of a coupling device or attachment usable with conveyor sections or shaft sections or any other type of sections, and has for its principal objective means for providing a tight connection at all times, which is not present in the usual type of connection, which gradually becomes worn with use.

I have used the character 10 to designate a tubular portion of helical conveyor to which is attached the inner cylindrical tubular portion 11, the character 12 indicating a centrally positioned shaft portion attached to a further section such as 10, 11 and as shown to the right of Figure 1, these sections being of the helical conveyor type, it being understood, however, that the invention will apply to other similar sections as well.

For providing the securing device of my invention, I provide the tapered openings 13, which tapers extend through the members 10 and 11 and also through the central shaft 12 terminating at 14, and which tapers can be formed with a suitable reaming tool.

Received within the tapered openings 13 are the opposed tapered bushings 15 which correspond to the taper of the openings 13, the bushings terminating inwardly at 16. It will be noted that the tapered bushings 15 extend a fairly substantial distance beyond the outer surface of the member 10, and received through the bushings 15 is a lengthened standard bolt 17 having the square turning head 18 which rests against the washer 19, which washer 19 rests against one of the bushings 15, the bolt being threadably engaged at 20 with the nut 21 which rests against a lock washer 22 which in turn rests against the further washer 23 which abuts against the end of the other bushing or sleeve 15.

The sleeves 15 are split apart as at 24 (see Figure 2) or can include a single split only as at 25 (see Figure 3).

It should be understood that these securing devices can be placed at intervals if such is desired, and for instance, can be placed 90° apart at spaced intervals.

When the usual round openings are employed with bolts, as the conveyor elements are rotated, thence stopped or reversed, the effect is to gradually enlarge these openings so that as a result considerable play and rattling will occur, thereby rendering the attachment relatively insecure, it being noted, however, that in my invention the tapered members will provide a tight joint at all times, since the effect of the taper is to provide this result, and if desired the nut 21 can be tightened from time to time. It will be equally obvious that this construction will apply to other structures as well.

Figure 4 illustrates a further modification wherein identical characters designate identical parts, and in this construction, however, the tapered openings 26 are employed, and engaging the tapered openings 26 are the tapered portions 27 of a special bolt 28 having the square turning head 29, the bolt portion 28 passing through suitable openings at 30 and being secured by means of the threadably engaged nut 31 engaging the threads 32 of the bolt. In this construction the wedging action of the tapered surfaces will provide a somewhat similar result to that of the modification shown in Figure 1, and in some instances the bolt unit will be easier to dislodge.

It will now be noted that I have provided the various advantages mentioned in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A device for attaching an outer tubular section to an inner drive section, comprising a bolt member, a pair of lengthened tapered opposed sleeves receiving said bolt member, said sleeves tapering to a reduced outer diameter inwardly, said sleeves extending substantially within said inner drive section, said outer tubular section and said drive section having tapered cavities conforming to and receiving said sleeves, said cavities extending inwardly beyond said sleeves, said sleeves extending beyond the outer confines of said outer tubular section, means for tightening said sleeves including a tightening nut threadably engaged with said bolt member and bearing against one of said sleeves, the head of said bolt member bearing against the other of said sleeves.

References Cited in the file of this patent

UNITED STATES PATENTS

| | | |
|---|---|---|
| 1,246,023 | Kirkham | Nov. 6, 1917 |
| 1,849,406 | McCrudden | Mar. 15, 1932 |
| 2,046,942 | Goeller | July 7, 1936 |
| 2,260,811 | Kozak | Oct. 28, 1941 |
| 2,385,519 | Jarrell | Sept. 25, 1945 |